United States Patent [19]

Edson

[11] Patent Number: 4,585,539

[45] Date of Patent: Apr. 29, 1986

[54] ELECTROLYTIC REACTOR

[75] Inventor: Gwynne I. Edson, Westminster, Calif.

[73] Assignee: Technic, Inc., Cranston, R.I.

[21] Appl. No.: 541,099

[22] Filed: Oct. 12, 1983

Related U.S. Application Data

[63] Continuation-in-part of Ser. No. 408,851, Aug. 17, 1982, abandoned, which is a continuation-in-part of Ser. No. 297,063, Aug. 27, 1981.

[51] Int. Cl.$^4$ .................. C25B 15/08; C25B 11/03; C25D 21/22; C25C 7/04
[52] U.S. Cl. ............................ 204/228; 204/231; 204/257; 204/260; 204/283; 204/273; 204/292; 204/295; 204/151; 204/110; 204/128
[58] Field of Search ............... 204/228, 260, 263–266, 204/222, 295–296, 282–283, 109–111, 149, 151, DIG. 13, 255–258, 105–106, 112, 114, 294

[56] References Cited

U.S. PATENT DOCUMENTS

| | | | |
|---|---|---|---|
| 3,930,968 | 1/1976 | Cramer et al. | 204/294 |
| 3,954,594 | 5/1976 | Recht | 204/283 X |
| 4,177,116 | 12/1979 | DeNora et al. | 204/260 X |
| 4,326,938 | 4/1982 | Das Gupta et al. | 204/228 |
| 4,377,455 | 3/1983 | Kadija et al. | 204/266 X |
| 4,411,759 | 10/1983 | Olivier | 204/263 X |
| 4,430,176 | 2/1984 | Davison | 204/284 X |

Primary Examiner—Donald R. Valentine
Attorney, Agent, or Firm—Seymour Rosenberg; Thomas Gunzler

[57] ABSTRACT

An improved electrolytic reactor is provided with a sealed enclosure subdivided into separate solution chambers for an anolyte and for a catholyte by the interposition of an electrically insulating septum with a microporous matrix. The microporous membrane, or septum, permits the controlled passage of ionic species but prevents the gross intermixing of the separate electrolytes in respective contact with the cathode and the anode of the reactor. At least one of the chambers defined on either face of the microporous septum is filled with electrically conductive particulate material—stainless steel balls in one embodiment—acting as extensions of the electrode in that chamber, so as to increase the electrically charged, stable surface available for electrolytic mass transfer. The polarity of the electrodes in the reactor is readily reversible to permit complex processes, such as the recovery of very dilute solutions of metallic ions by first depositing them on an extended-surface cathode and, afterwards, depleting them into suitable recovery solution. The flow passages through the solution chambers are so defined, either by dimensional control or by packing the chamber with static conductive material, so as to ensure turbulent flow of the electrolytes through at least one active chamber in the reactor. Reactors embodying the teachings of the invention may be cylindrical or polygonal, and may contain auxiliary electrodes for use during polarity-reversed operation.

The electrolytic reactor is particularly useful, but not limited to the continuous removal of relatively small concentrations of metal ions from large quantities of solutions.

61 Claims, 14 Drawing Figures

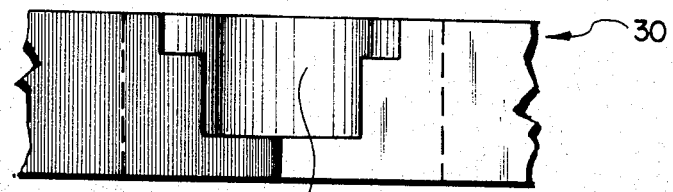
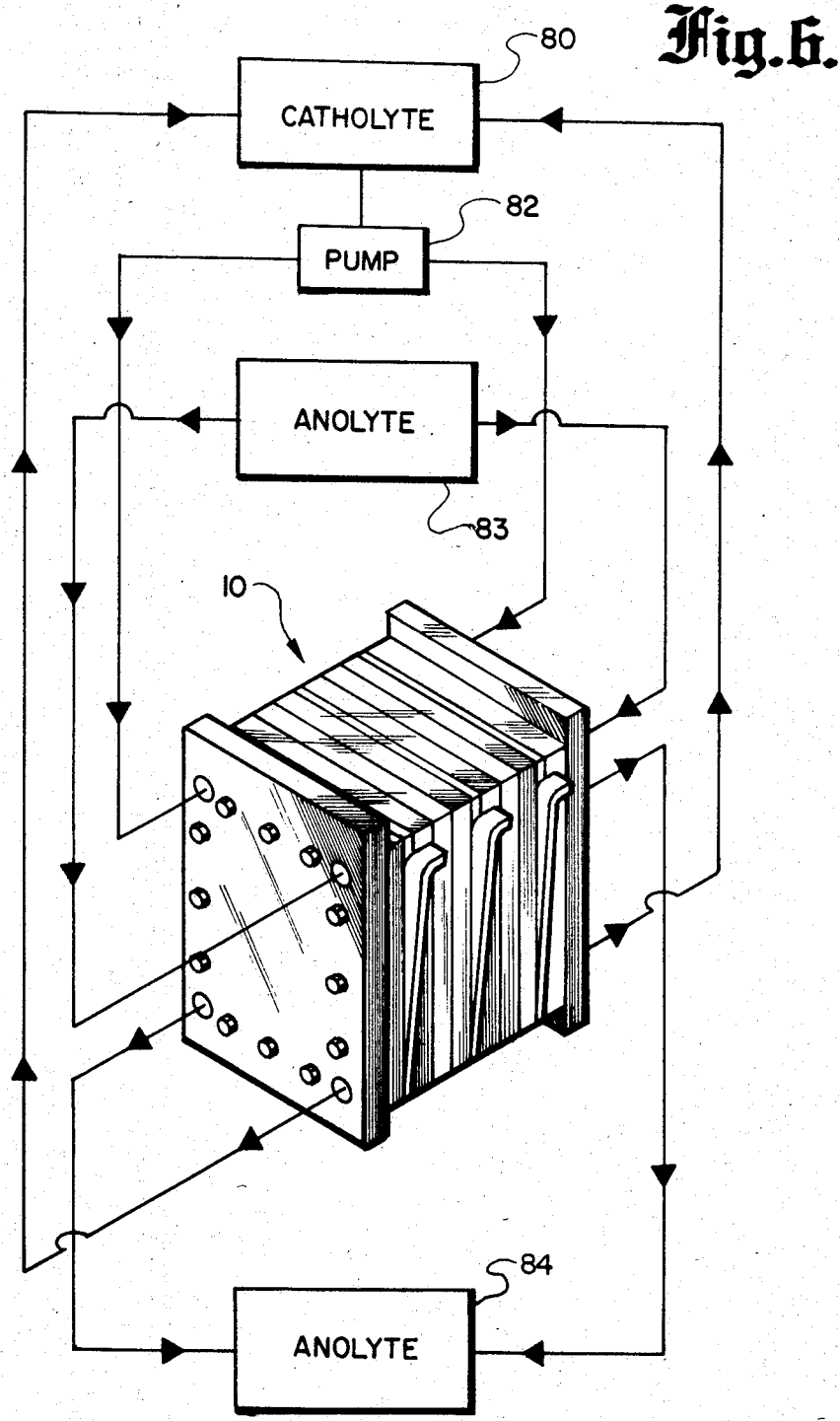

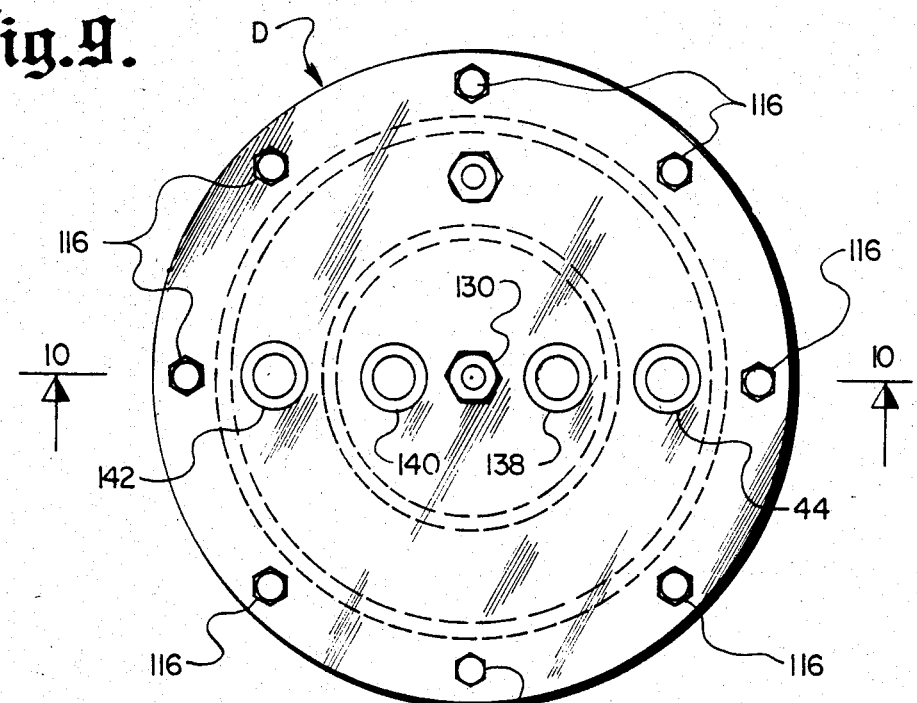
Fig. 9.
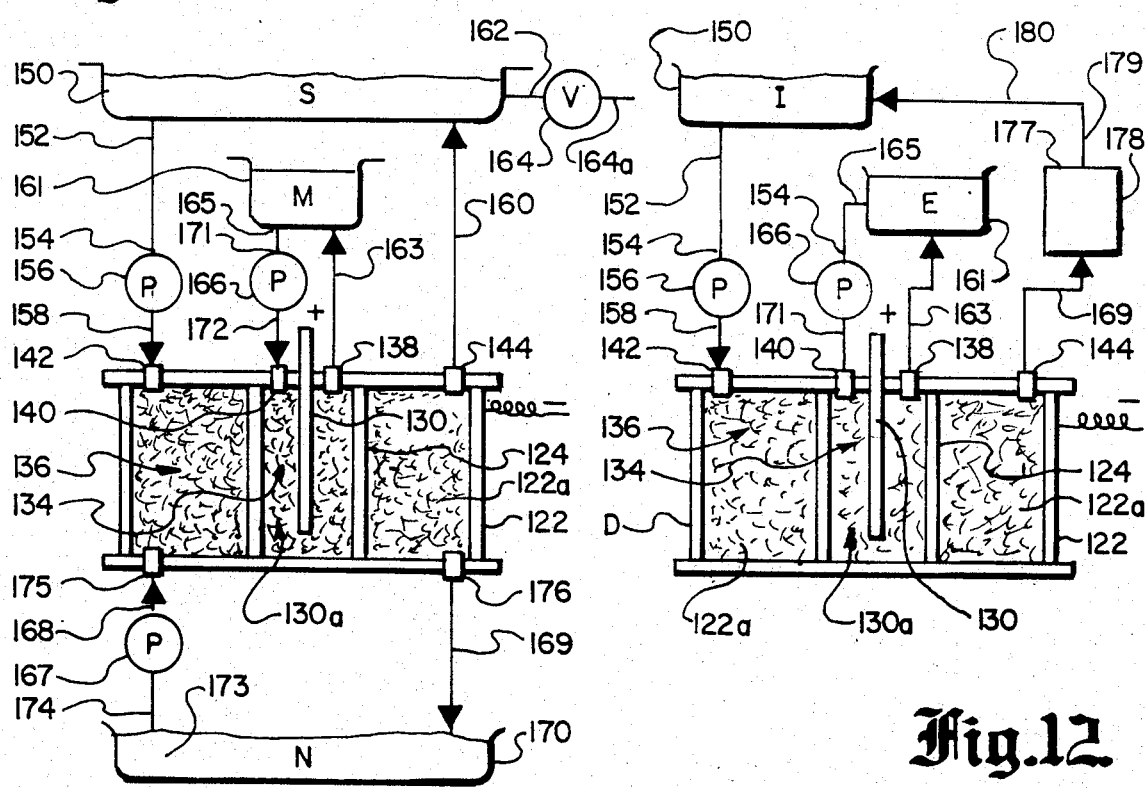
Fig. 11.
Fig. 12.

ELECTROLYTIC REACTOR

CROSS-REFERENCES

This application is continuation-in-part of my co-pending application Ser. No. 408,851—filed Aug. 17, 1982 now abandoned—which is a continuation-in-part of my application, now abandoned, Ser. No. 297,063—filed Aug. 27, 1981.

BACKGROUND OF THE INVENTION

The instant invention relates to electrolytic reactors; it relates, more particularly, to sealed-volume reactors wherein two separate solution chambers are associated with the cathode and anode of the imposed electrical cirtuit, respectively, with the two chambers separated by a micro-porous septum.

The use of electrolytic cells for the treatment of electroactive species in a solution, such as removing metal contaminants from waste water, is known. For example, such a cell and a process are described in U.S. Pat. No. 4,308,122. That patent also describes the use of a diaphragm between the cathode and the anode of the cell, the diaphragm inhibiting fluid mixing from the region of the cathode to the region of the anode, but permitting passage of ionic species through it.

A problem with prior art cells is that they are relatively inefficient in removing small concentrations of metal from large volumes of solvent. When removing metal from solutions containing low concentrations of the metal, typically a deficiency of metal ion exists at the interface between the cathode and the electrolyte. This condition is described as Concentration Polarization and the layer around the cathode where this condition exists is called the Nernst layer. Removal of the metal from the solution is controlled by the rate by which the metal ions can diffuse to the cathode.

Other prior-art devices rely on the increased mass transfer rates made possible by the application of fluidized-bed principles, with masses of small, electrically conductive bodies suspended in the electrolyte and in periodic contact with an electrode. In such devices increased surface concentrations are achieved at the expense of low charge transfer rates induced by the intermittency of the electrical contact of the fluidized-bed particles with the current source.

Thus, it is apparent that there is a need for an electrolytic cell which is capable of continuously removing metals from large quantities of solutions, where the solutions contain only relatively small concentrations of metal ions, i.e., in the order of less than 500 ppm (parts per million).

There is also a need, increasingly motivated by environmental concerns and by the ever-increasing cost of disposing of even small amounts of many metals, of reactors capable of intermittent reversible operation; or the performance, simultaneously, of different chemical treatment pocesses in separate treatment chambers; for the modification of solute comlexes; the destruction of chemical species, such as cyanides, which are harmful or even poisonous; and other electrochemical processes in reactors of small physical size which can be operated at high currents and at relatively low drive potentials.

SUMMARY

The present invention is directed to an electrolytic cell that meets this need. The cell comprises first and second electrodes and first and second chambers located between the first and second electrodes. An electrically insulating microporous membrane is located between the first and second electrodes and delimits the first and second chambers. The first chamber is between the first electrode and the septum and the second chamber is between the second electrode and the septum.

Because of the insulating properties of the septum the inner and outer compartments may be packed with metallic wool, balls or granules of metal or carbon particles or fibers of an appropriate nature to increase the area of the metallic deposition site, as well as increase the effective area of the anode and cathode to control current density.

Inlets and outlets are provided for continuously introducing and removing solutions from both chambers. An important feature of this invention is that the septum and the first electrode are spaced apart by no more than about one inch, and preferably by no more than about one half inch. With this close spacing, it is possible to introduce a solution to the first chamber at a sufficiently high rate that the solution passes through the first chamber under turbulent flow conditions. Because of the turbulent flow, the thickness of the Nernst layer at the first electrode is greatly reduced, thereby increasing the concentration of ions at the first electrode and increasing the rate at which the metal ion can be plated onto the first electrode.

In general, turbulent flow conditions are attained in the reactors of the invention by reduced dimensions of the flow passages forming the electrolyte chambers, or by the packing of these chambers with conductive particulate material in electrical contact with the electrode in that chamber, or by a combination of the two techniques.

The invention contemplates that the sealed enclosures defining the external shape of the solution chambers forming the reactors may take different forms; particular descriptions of cylindrical and polygonal—preferably of square cross-section—forms of such reactors are included hereinbelow.

The septum—a rigid membrane or diaphragm—may be advantageously be constructed from alumina or a similar ceramic matrix having the properties of a bulk electrical insulator with interconnecting micropores through which ionic species may be passed from one solution chamber into the other, thereby transporting the electrical charges which define the electric current throughput of the reactor. The thickness of the septum is defined by the required physical and electrical properties, including the need to support the closely packed surface-extending material which may be charged into one, or both, of the chambers abutting on the septum.

The external current source—battery, rectifier or other—powering the reactor forms no part of the invention in its constructional details, except for the provision of means—in the form of reconnectable external terminal posts or electrical switchgear—permitting the reversing of electrode potentials. In some embodiments provision is made for auxiliary electrodes for use during polarity-reversed operation.

In the use of this electrolytic cell, in "forward" operation, the first electrode operates as the cathode and the second electrode operates as the anode. Metal ion present in the first solution plates onto the cathode, i.e., the first electrode. In the forward operation, both solutions may be the same.

In "reverse" operation, the first electrode operates as the anode and the second electrode operates as a cathode. Solution is continuously passed through the first chamber for removing deposited metal from the first electrode to recover the metal and to reuse the first electrode.

In a preferred version of the present invention, the electrolytic cell is a flat plate cell, the first electrode, second electrode, and membrane all being polygonal with the edges of the electrodes being substantially in register and coextensive.

The first chamber can be provided with packing to increase the rate at which metal is removed from solution. When the first chamber contains packing, preferably the velocity of the solution passed through the first chamber is at least about one foot per second. When the first chamber does not contain packing, preferably the velocity of the solution passed through the first chamber is at least about three feet per second. These velocities are calculated on the basis of the transverse flow passage section between the inlet port and the discharge port prior to the introduction of the static packing material.

DRAWINGS

These and other features, aspects, and advantages of the present invention will become better understood with reference to the following description, appended claims, and accompanying drawings, where:

FIG. 5 is a view along line 5—5 of FIG. 4;

FIG. 6 schematically shows a process using an electrolytic cell according to the present invention.

Figure 7:
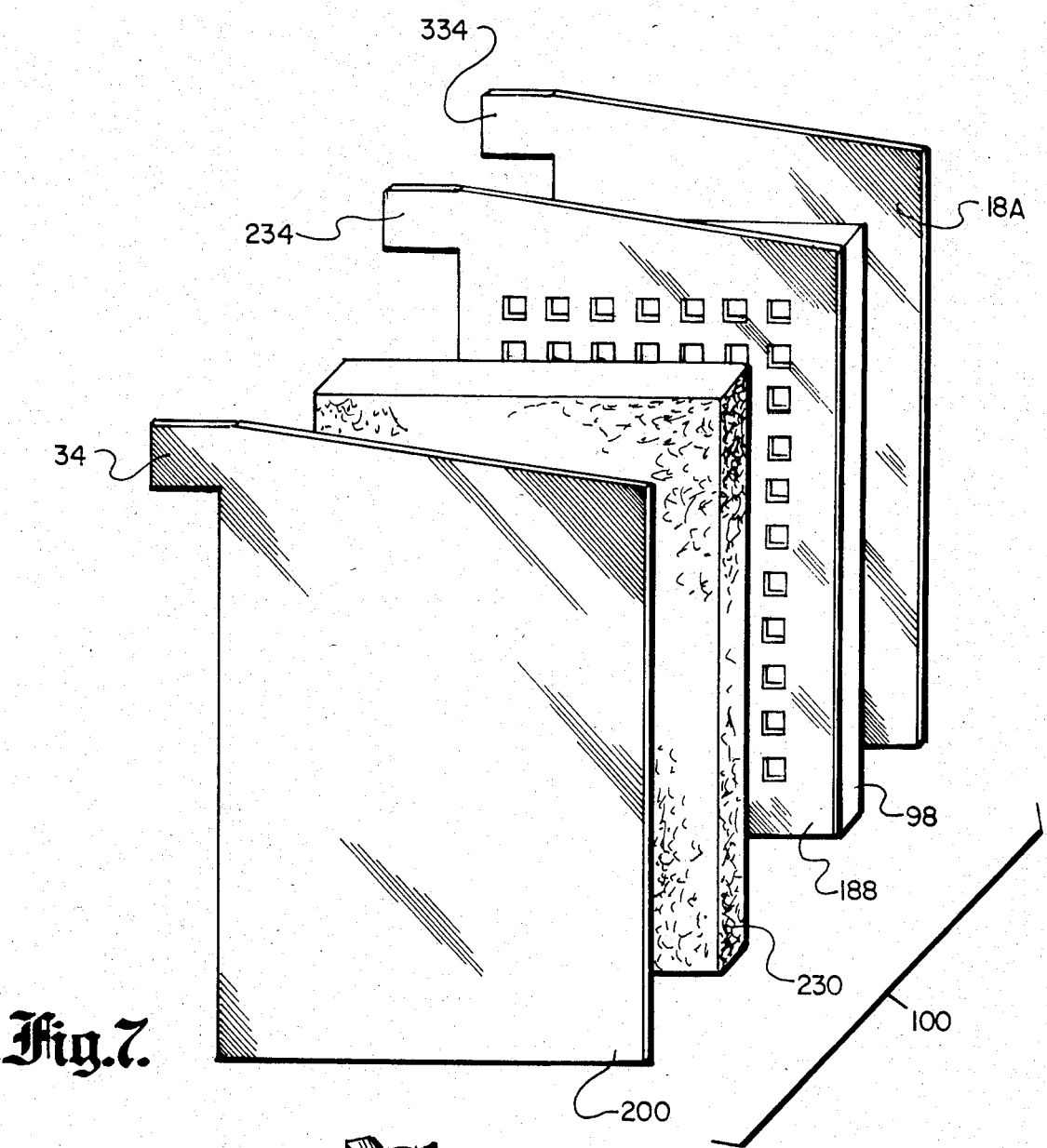
Figure 8:
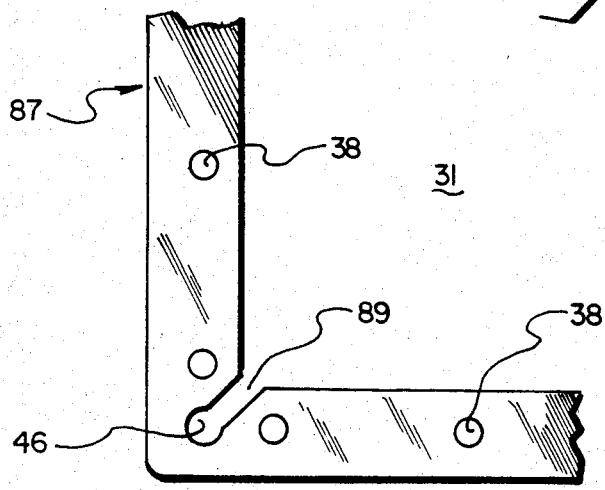
Figure 10:
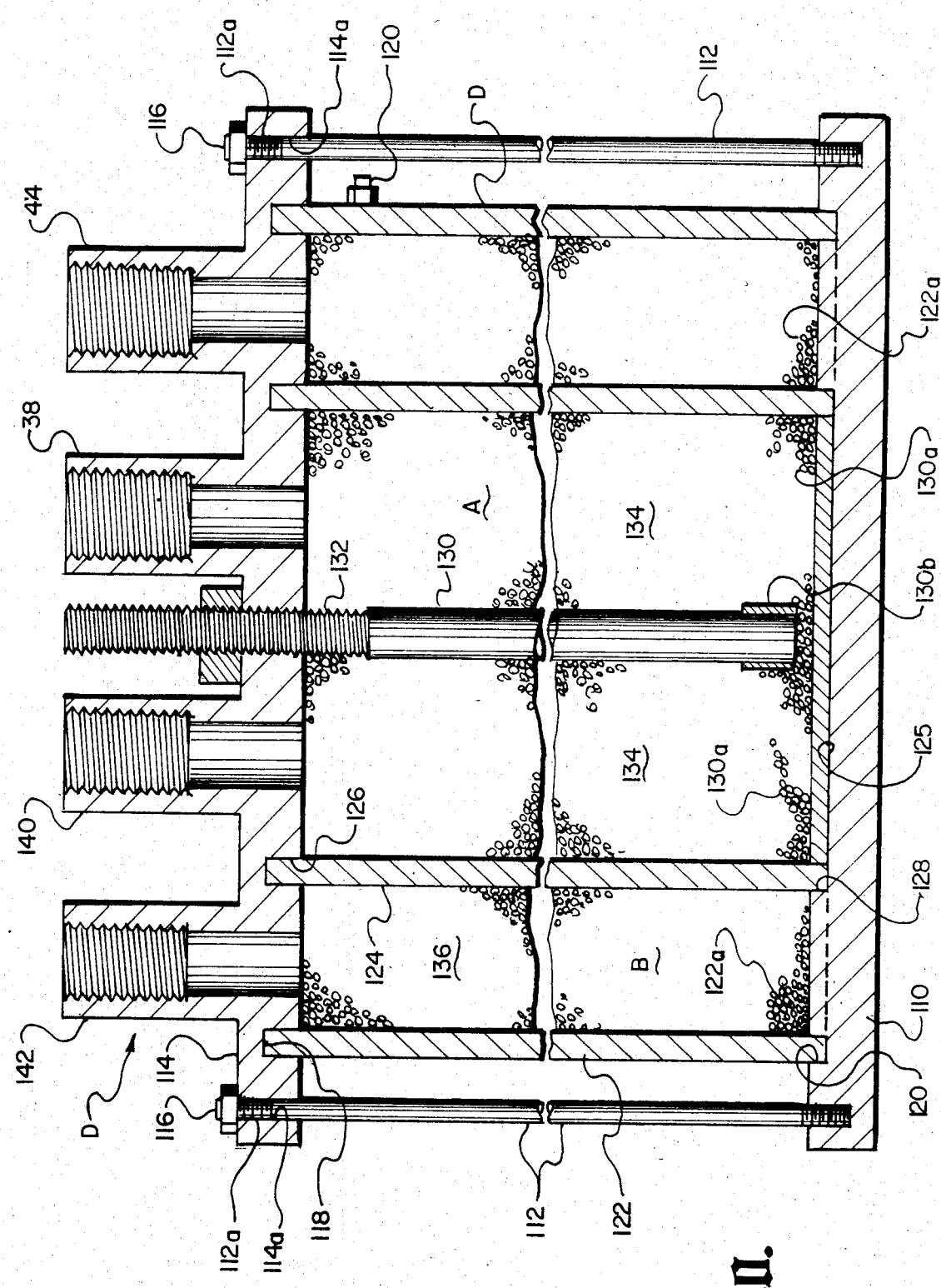
Figure 13:
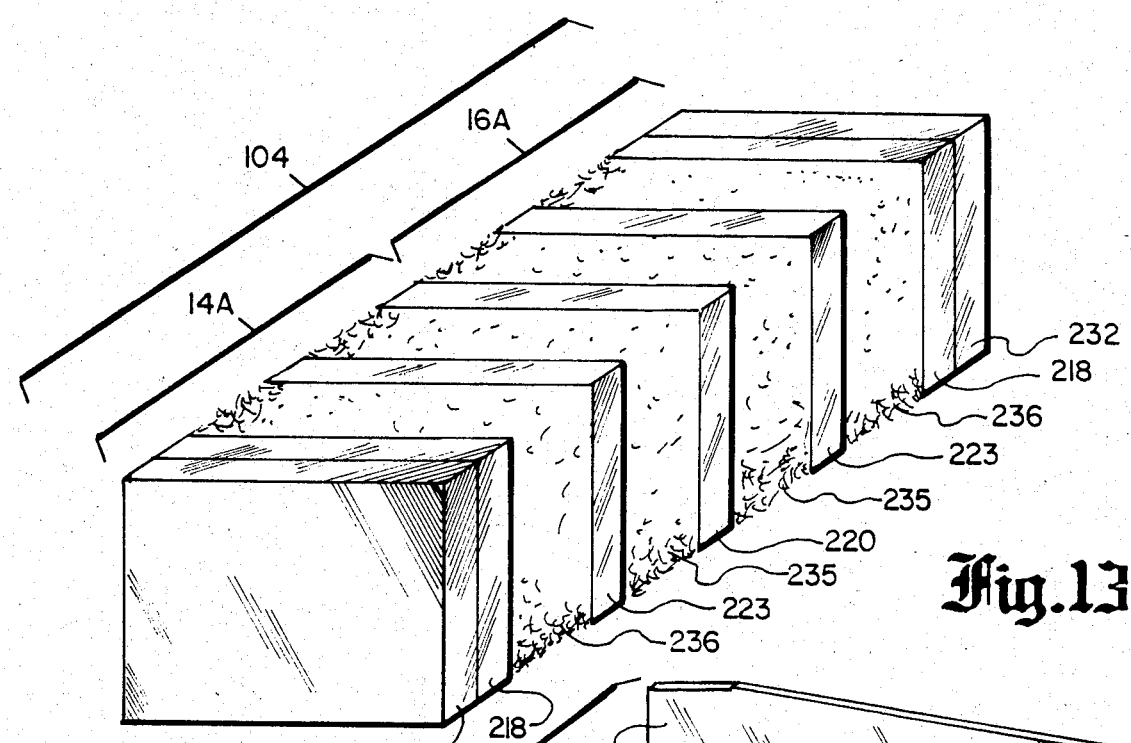
Figure 14:
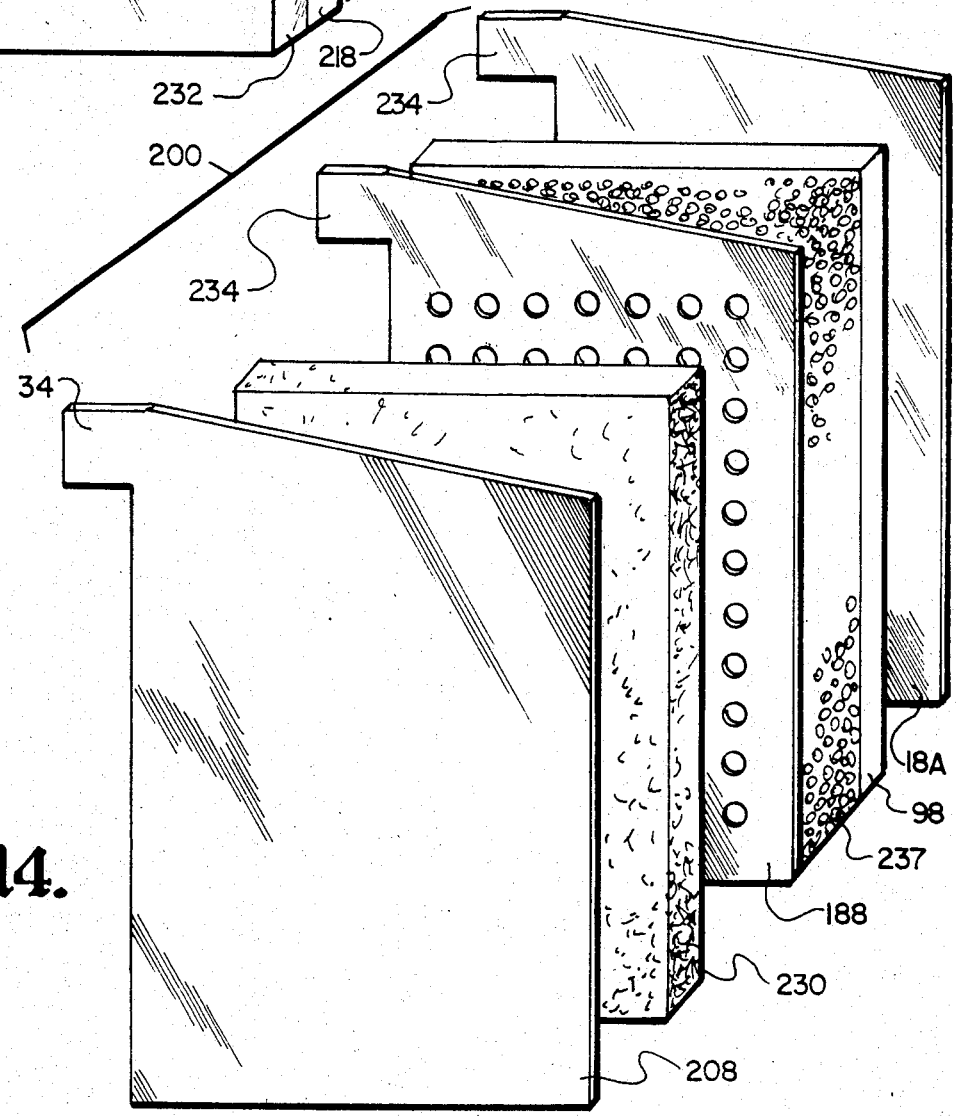

FIG. 7 is an exploded, partially schematic, view of a polygonal reactor of the invention employing two plate electrodes in one of the electrolyte chambers;

FIG. 8 is a partial frontal view of a gasket used in a polygonal plate reactor embodiment;

FIG. 9 is a top view, in plan, of a cylindrical embodiment of the electrolytic reactor;

FIG. 10 is a longitudinal cross-section through the embodiment of FIG. 9;

FIG. 11 is a diagrammatic view of an electrolytic reactor of the invention employed in conjunction with a tank containing toxic or precious metals for the removal of such metals from the solution therein and the rejection of same to a sewer or like disposal sink;

FIG. 12 is a diagrammatic view of an electrolytic reactor, utilized to remove precious metals from a reflux solution used to regenerate an ion exchange resin bed;

FIG. 13 is a perspective view of a schematized plate reactor constructed from chemically inert materials; and FIG. 14 is also a perspective, partly schematic view of a particular plate reactor employing three electrodes.

DESCRIPTION

Figures 1, 2:
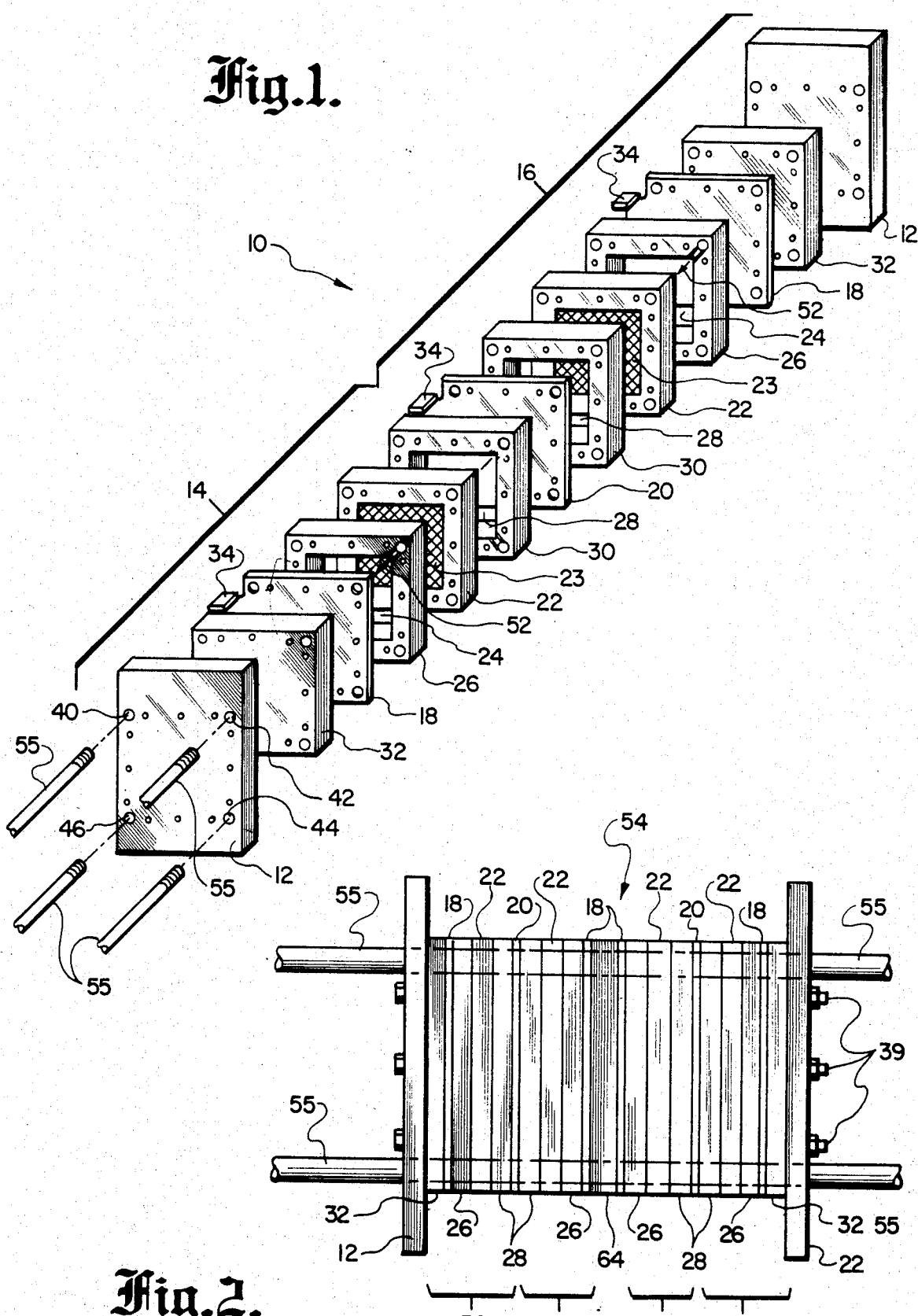
FIG. 1 is an exploded perspective view of an electrolytic reactor containing two electrolytic cells according to the present invention.
FIG. 2 is a side elevation view of an electrolytic reactor comprising four electrolytic cells according to the present invention.

FIG. 1 shows a perspective view of a reactor 10 according to the present invention which comprises two electrolytic cells. The reactor 10 will be described below as used for removing a metal from a solution, i.e., the cathode will be where the metal plates out. However, it will be realized that by reversing the polarity of the current to the cell, what is described below as the cathode can become the anode and vice versa.

With reference to FIG. 1, the reactor 10 comprises two steel or plastic support end plates 12 and sandwiched therebetween two electrolytic cells 14 and 16, Each cell 14 and 16 comprises a first electrode or cathode 18, a second electrode or anode 20, and a membrane member 22 having a diaphragm or porous septum 23 therebetween, with the first electrode 18 proximate to one of the end plates 12. The two cells 14 and 16 share a common anode 20.

There is a first or catholyte chamber 24 between the membrane member 22 and the first cathode 18, the thickness of the first chamber being determined by a catholyte frame 26 between the membrane 22 and the first electrode 18. Similarly, there is a second or anolyte chamber 28 between the anode 20 and the membrane 22, the thickness of the anolyte chamber 28 being determined by an anolyte frame 30.

There is a port plate 32 between each of the end support plates 12 and their respective first cathode 18.

The reactor 10 is a flat plate reactor with each of the elements thereof substantially of a rectangular outline. When assembled together, all the major elements have their edges in register with one-another.

Figure 3:
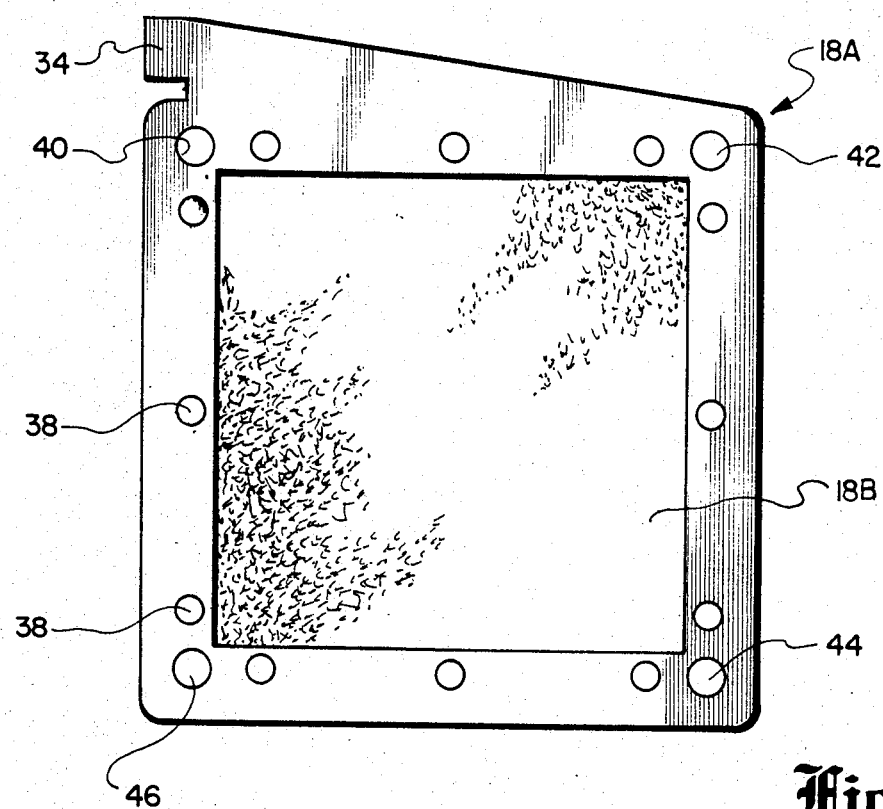
FIG. 3 is a front elevation view of an electrode useful in the cells of FIGS. 1 and 2.
Figure 4:
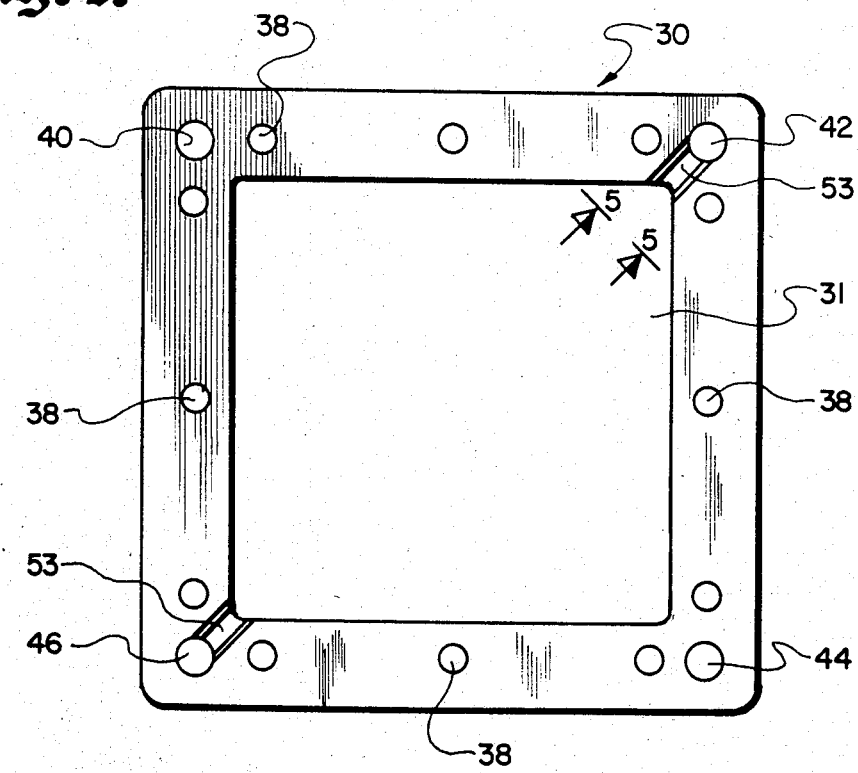
FIG. 4 is a front elevation view of an electrode frame useful in the cells of FIGS. 1 and 2.

As shown in FIG. 3, the electrodes 18 and 20 are essentially flat plates—suitably made from a stainless steel or from titanium for corrosion resistance—with tabs 34 for connection to the electrical power source. The spacers 26 and 30, also shown in FIG. 4, are essentially rectangular frames constructed from an electrically insulating material with an empty central portion 31 to define the first and second solution chambers, as appropriate. The central rectangular septum 23 is also provided with a frame 22 for support; the cross-hatched pattern shown in FIG. 1 differentiates the microporous septum 23 from the surrounding frame 22.

Each of the main elements of the reactor assembly 10 has a plurality of bolt holes 38 disposed around its periphery. To assemble the various elements the bolt holes 38 are aligned and bolts 39—acting as tie-rods and made from an electrically insulating material to prevent shorting of the electrodes—are passed through and locked in place with the aid of nuts and washers.

The four corners of the elements of the reactor 10 are each provided with fluid channels, forming a continuous conduit when the reactor is assembled; These ports, beginning with the top left hand corner in FIG. 1 and proceeding clockwise, form the anolyte inlet port 40, catholyte inlet port 42, catholyte outlet port 44, and anolyte outlet port 46. The inlet and outlet ports for each fluid are at opposing corners, so that the anolyte and catholyte solutions flow in a cross-current flow pattern in the reactor. The inlet and outlet ports may be interchanged to cause the fluids to flow in an upward direction through the solution chambers.

The port plates 32 are provided for connecting pipes 55 to the reactor 10. The ports 40, 42, 44 and 46 of the port plates 32 are threaded to receive correspondingly threaded plastic pipe conduits 55.

The membrane 23 controls the passage of ionic species between the solution in the first chamber and the solution in the second chamber, with the simpler—and consequently smaller—ionic species passing more readily therethrough than the large, complex ions in which metallic species are more commonly found in electrolytes. The membrane, or septum, 23 permits the flow of current between the elctrodes in the chambers on either side, but prevents the gross intermixing of the conductive solutions in the two chambers. Because of the presence of the septum 23, solutions with different physical and chemical attributes may be employed in the reactor chambers, and it is possible to maintain flow regimes which also differ—for example having highly turbulent flow in one chamber, while holding a quiescent electrolyte in the other.

Preferably the first chamber is packed with metallic wool, balls or granules of metal or carbon particles or fibers of an appropriate nature, or the like, to increase the area of the metallic deposition site, to increase turbulence in the first chamber and to increase the effective area of the cathode to control current density. The anolyte chamber can also contain appropriate packing of a conductive material or alloy.

The packing used to increase the effective area of the anode and/or the cathode can be formed from steel, stainless steel, copper, or other metal alloy suitable for the particular electrolytic process being performed in the reactor. The packing can also be formed of, or contain, carbon fibers, stainless steel balls or particles, or metallized plastic balls.

The catholyte chamber of the flat plate reactor 10 is made shallow—in the dimension separating the septum 23 from an adjacent cathode—to maintain turbulent flow conditions when the catholyte is pumped through the reactor at even relatively low flow rates. In general, the cathode 18 and the membrane member 22 should not be spaced apart by more than one inch, and, in a preferred mode of construction they are spaced apart by not more than ½ inch. At the same time, it is desirable not to make the flow passage thinner than about ¼ inch—to avoid excessive pressure drops at high flow velocites—so that the optimum range of this dimension for reactors constructed for general service, rather than optimized for particular working conditions, is about ⅜ inch.

To attain turbulent flow, preferably, solution is passed through the first chamber at a velocity of at least about three feet per second when packing is not used, and at a velocity of at least about one foot per second when packing is used. The velocity of the solution is determined by dividing the cubic feet per second of solution introduced into the chamber by the cross sectional area of the chamber. The area is computed transverse to a line joining the inlet and outlet ports.

The cathode can be formed of a metal such as stainless steel, titanium, carbon, or a metallized plastic.

Similarly, the anode can be made from stainless steel or lead. Also, the anode can be titanium, tantalum, or columbium; or coated with either an iridium oxide coating such as TIR-2000 available from Diamond Shamrock, or platinum.

The reactor 10 of FIG. 1 is shown as having two cells 14 and 16 sharing a common anode 20. Alternatively, the reactor 10 can be formed comprising two cells sharing a common cathode. In fact, when the polarity of the current used with the reactor 10 is reversed, as described below, the reactor 10 in effect becomes one where two cells are sharing a common cathode.

In the version of the invention shown in FIG. 2, a reactor 54 has four cells 56, 58, 60 and 62. In effect, the reactor 54 comprises two reactors 10 back to back, where the end support plates 12 that would be common are replaced by an electrically non-conductive divider 64 which does not have any fluid ports.

With reference to FIG. 6, a reactor 10 according to the present invention is used by continuously introducing a solution 80 to the catholyte chambers and continuously withdrawing the solution from the catholyte chambers under turbulent flow conditions. Turbulent flow can be obtained by pumping the solution with a pump 82. Electrical current is provided to the reactor 10 so that the first electrode serves as a cathode and the second elecrode serves as an anode. Metallic species in the solution 80 plate out on the first electrodes 18. When substantially all of the metal ions are removed from the solution 80, the solution is discarded and the recovered metal is collected by removing and replacing the first electrode 18, or by "reverse" operation of the system, as described below.

During this "forward" operation, (1) an anolyte solution 83 can be continuously circulated through the second chamber, (2) anolyte solution 83 can be introduced into the second chamber and periodically replaced, or (3) solution 80 can be circulated in the second chamber, i.e. solutions 80 and 83 can be the same. The third alternative is important for treating cyanide solutions because both metal recovery and treatment of the cyanide, by oxidation, are accomplished simultaneously.

In "reverse" operation, the first electrode serves as an anode and the second electrode serves as a cathode. Solution is continuously passed through the first chamber to recover the metal plated on the first electrode.

The reactor 10 is useful for removing a small concentration of precious and toxic metals from a solution. Among the metals that can be removed a nickel, gold, silver, copper, lead, cadmium, and the like. These metals can be removed from the solution in concentrations as low as 1 ppm. For example, the reactor 10 can be used to recover silver from hypo solutions in the photographic field; recover precious metals from aqueous solutions such as waste liquors; strip cyanide leach solution in the mining industry; and treat waste liquids to remove valuable toxic metal ions.

The solutions introduced to the catholyte and anolyte chambers can be the same in the "forward" mode of operation, unless an undesirable oxidation product could be generated at the anode. For example, if the solution to be treated contains ammonium thiocyanate, preferably such a solution is not used as the anolyte solution because the sulphur compound would decompose at the anode.

In the "reverse" operation, it is necessary to have different catholyte and anolyte solutions or else the metal that is stripped off the cathode would plate onto the anode.

In the "reverse" operation, the solution that is introduced into the first chamber, known as the stripping solution, can be a solution with ions such as cyanide, sulfate, chloride, fluoborate, sulfamates, nitrates and other common ions present in electroplating and similar solutions.

Reactors of the present invention have significant advantages. Because of the turbulent flow, high efficiency is possible, even with a reactor that is of small size. For example, a 200 ampere reactor can be only 16 inches by 18 inches by 10 inches. Moreover, a low metal concentration in the feed stream can be efficiently processed.

Another advantage is that the membrane, because it is an insulator between the anode and cathode, provides protection from electrical shorts.

Further, because the reactor can be used in both the "forward" and "reverse" modes, little, if any, cell maintenance is required.

Because of the turbulent flow and the high surface area resulting from packing, high efficiencies with short process times are attainable.

An alternate embodiment of the polygonal plate reactor of the invention is illustrated in the perspective view of FIG. 7. In this illustration the chamber-defining spacers, connecting bolts, and other purely mechanical components of the plate reactor have been omitted for the sake of clarity of illustration, and only the active elements of the cell portrayed in appropriately spaced relation.

Plate electrodes 200 and 18A define the extremities of the first and second solution chambers, respectively, while a porous ceramic septum 230 represents the dividing membrane between the two chambers. An additional electrode 188 is provided, spaced from both the septum 230 and the plate electrode 18A, backed by an electrically insulating spacer 98. The electrode 188 is advantageously constructed from a stainless steel or from titanium, to confer good corrosion resistance in the chemically active solutions treated in a reactor 100 of which they are components, while the spacer 98 is readily constructed from rigid PVC or polyethylene, or other chemically inert and electrically insulating polymer. Both the electrode 188 and the spacer 98 are pierced by a plurality of large orifices, sufficient to ensure free solution passage between the two compartments of the second solution chamber, divided by their introduction into the reactor.

The electrode 18A will generally be of a type shown in FIG. 3, where the central portion of the electrode face is plated or coated with a material acting as a catalyst for some particular electrochemical reaction which is to be undertaken in the reactor. In the forward operating mode the electrode 18A will generally be the anode of the cell, while electrode 200 is the cathode.

It is often found that when the electrode polarities are reversed, and the electrode 18A is utilized as the cathode, a situation may occur when defoliation of such catalytic material may take place caused by the anodic reaction. The auxiliary electrode 188 is therefore provided and utilized as the cathode of the reactor for reverse operations. In such use of the reactor 100, the electrode 18A will, generally, be not connected to the power source, while it is the auxiliary electrode 188 which is left disconnected from the power supply during the forward operation.

The provision of two plate electrodes in the same solution chamber of a given reactor will, therefore, provide an additional variable which can be utilized in the operation thereof, increasing the versatility and utility of the reactor of the invention. Additionally, it is possible to gear other desirable features to the presence of the auxiliary electrode—for example, while the use of packing materials with a catalytic electrode is not advisable, since the packing will not, in general, have the chemical activity associated with the catalyst, it may be desirable to provide surface extending means during a reverse-polarity operation. Where such is the case, the interspace between the auxiliary electrode 188 and the septum 230 may be filled with appropriate packing, without affecting the operation of the cell when the primary electrode 18A is in the circuit. Connector tabs 34, 234 and 334 project from each of the electrodes 200, 188 and 18A, respectively, to be used as connectors for the electrical circuit.

The electrode 18A is particularly illustrated in FIG. 3, where a central region 18B is shown stippled, as a representation of the chemically active coating which is applied to a plate electrode of this particular type. Simpler plate electrodes 18 and 20 are made from flat sheets of a conductive metal alloy, and the central area—corresponding to the central region 18B—merely defines the surface portion exposed to the adjacent solution chamber.

The fragmentary view of FIG. 8 illustrates an alternate method of channelling solution from a typical distribution gallery 46 into a typical solution chamber 31, via a cutout 89 in the isulating gasket 87, whose outline and development follow that of spacer plate 30 as illustrated in FIG. 4. The flow channel 89 may replace the milled port 53 of FIGS. 4 and 5, or may be employed in conjunction therewith, increasing the passage area available for introducing electrolyte into a solution chamber, or draining it therefrom.

The cylindrical electrolytic cell D of the present invention is illustrated in FIG. 10 as including a circular base plate 110 of a rigid electrical insulating material that has a number of vertical, circumferentially spaced rods 112 extending upwardly therefrom that have upper threaded ends 112a. The threaded ends 112a project through spaced transverse bores 114a in a top plate 114 formed from a rigid insulating material. The upper extremities of threaded ends 112a are engaged by nuts 114.

First and second circular grooves 118 and 120 are formed on the adjacent surfaces of top plate 114 and base plate 110, and are sealingly engaged by the upper and lower marginal end portions of a metallic cathode cylindrical shell 122.

A cylindrical shell 124 of a micro-porous material such as alumina is provided, which shell is of substantially smaller diameter than shell 124, has the upper and lower ends sealing disposed in first and second grooves 126 and 128 formed in the adjacent faces of top plate 114 and base plate 110. The shell 124 is illustrated in the drawing as having a bottom 125.

An anode rod 130 is centrally disposed on top plate 114 and extends downwardly through an opening 132 therein to the base plate 110. The base plate 110, top plate 114 and cylindrical shell 124 cooperate to define a central cylindrical compartment 134 in which an anolyte A is contained. The cathode shell 122, cylindrical shell 124 top plate 114 and base plate 110 cooperate to define a confined annulus shaped space 136 in which the catholyte C is contained. First tubular inlets and outlets 138 and 140 are supported from top plate 114 and communicate with centered compartment 134. Second tubular inlets and outlets 142 and 144 are also supported from top plate 114 and communicate with outer compartment 136.

The inner compartment 134 is preferably packed with metallic wool, balls or metal particles to provide anode area increasing elements 130a that are in electrical communication with the anode 130. Increasing the effective areas of the anode and cathode lower the current density and minimize the evolution of oxygen at the anode.

The metal elements 130a and 122a that increase the effective area of the anode and cathode may be formed from steel, stainless steel, copper or other metals suitable for the particular electrolytic operation being performed.

Anode 130 is illustrated as a metal rod. The rod may be coated or sheathed with titanium, tantalum or columbium 130b to prevent disintegration of the anode after prolonged usage.

The micro porous septum 124 is an electrical insulator that separates the anode and cathode area increasing elements 130a and 122a, as well as the anolyte 134 and catholyte 136, but permits the flow of ions therethrough when the anode 130 and cathode 122 have an electrical potential therebetween.

The cell D is susceptible to numerous uses as previously mentioned. For instance a tank 50 as shown in FIG. 11 may have a discharge line 152 leading therefrom to the inlet 154 of a power driven pump 156 that has a discharge line 58 leading therefrom to inlet opening 142. Opening 142 is in communication with the cathode compartment 136 of cell D. Cathode compartment outlet 144 is connected to a conduit 160 that extends back to tank 150.

The tank 150 holds an aqueous solution S containing toxic compounds such as the salts of cadmium, copper, nickel and lead and non-toxic salts if the conductivity of the solution needs to be increased.

The tank 161 holds an aqueous solution M containing non-toxic salts compatible with the solution S. Tank 161 may have a discharge line 165 leading to the inlet 171 of a power driven pump 166 that has a discharge line 172 leading therefrom to inlet opening 140. Opening 140 is in communication with the anode compartment 134 of cell D. The anode compartment outlet 138 is connected to conduit 63 which extends back to tank 161.

Tank 170 holds an aqueous solution N which may be the process solution from which the original toxic or precious metals were removed during processing. Tank 170 may have a discharge line 173 leading to the inlet 174 of a power driven pump 167 that has a discharge line 168 leading therefrom to inlet opening 175. Opening 175 is in communication with the cathode compartment 136 to cell D. The cathode compartment outlet 176 is connected to conduit 169 which extends back to tank 170.

When solution S is recirculated through the cathode compartment 136 and solution M is recirculated through the anode compartment 134 of cell D as shown in FIG. 11 and an direct current is supplied through anode 130 to cathode 122 the positively charged ions will plate out on the cathode surface increasing elements 122a. Solution S will not be oxidized since solution M is at the anode.

Tank 150 has a drain line 162 extending from the bottom thereof that is in communication with a normally closed valve 164 that has a line 164a leading therefrom to a disposal site (not shown). After substantially all of the toxic or precious metal has been removed from the solution S by recirculation through the cell D as described, the valve 164 is opened and the solution S discharged to line 164a.

While the plated elements 122a may be removed from cell D for recovery of the toxic or precious metal it is usually more desirable to recycle the recovered metal back to the process solution. Metal collected on elements 122a to cell D may be returned to the process solution N in tank 170 by reversing the polarity on the electrodes. Under this system electrode 122 will become the anode and electrode 130 the cathode. Compartment 134 will now be the cathode compartment and compartment 136 the anode compartment. Solution N is passed thorugh compartment 136 and solution M through compartment 134. The metals deposited on elements 122a will re-enter the process solution N and hydrogen will be produced at the cathode 130 and be discharged through outlet 138 to tank 161 entrained in the solution.

In FIG. 11 cyanide residues may be destroyed by placing them in tank 161 and adding to solution M a quantity of a base metal salt such as sodium chloride. Under electrolysis at the anode 130 both chlorine and oxygen are formed which quickly break the cyanide down to the non-toxic cyanate form.

In FIG. 12 the cell D is shown in a situation where external chemical stripping of metal from ion exchange resin is balanced with metal removal in the cell D on elements 22a. Separation of the catholyte from the anolyte is critical in this process since the catholyte solution would be decomposed by the anodic oxidation. A tank 150 contains an aqueous solution T of a base metal salt connected to either a thiocyanide or thiosulfate radical. A line 152 extends to the inlet 154 of a power drive pump 156 and discharges through line 158 to inlet 142. Inlet 142 is in communication with the cathode compartment 136 or cell D. The outlet 144 of compartment 136 is connected to a line 169 which extends to the inlet of a tank 178 that contains an ion exchange resin 177, and the tank having an exit 179 from which a line 180 returns to tank 150. The ion exchange resin 177 contains metals (usually precious metals) from previous usage.

Tank 161 contains an aquous solution of a compatible electrolyte F such as sodium cyanide or potassium sulfate. Tank 161 may have a discharge line 165 leading to the inlet 171 of a power driven pump 166 that has a discharge line 172 leading therefrom to inlet opening 140. Opening 140 is in communication with the anode compartment 134 of cell D. The anode compartment outlet 138 is connected to conduit 163 which extends back to tank 161.

When an electric current is passed through anode 30 to the cathode 122 while solution F is passing through compartment 134 and solution T is passing through compartment 136, the metal removed chemically under equilibrium conditions from the ion exchange resin 177 in tank 178 is deposited on the cathode elements 122a. By removing the metal from solution T equilibrium conditions may be maintained in the extraction reaction of the ion exchange resin 177. By this method substantially all the metal may be removed from the ion exchange resin 177 to the cathode elements 122a of cell D. Once collected on the cathode elements 122a the metal may be recycled back to the process solution as described earlier under FIG. 11. The ion exchange resin 177 once stripped of the metal can be regenerated for reuse.

The perspective, simplified illustration of FIG. 13 a reactor assembly 104, comprised of two polygonal plate reactors 14A and 16A, which share a common plate electrode 220. The shared electrode 220 in the respective second chambers of the reactors 14A and 16A, as well as plate electrodes 218 associated with the first solution chambers of these reactors, is constructed from graphite. Microporous septums 223 in both reactors is made from an inert ceramic material, alumina in the preferred mode of construction, while packings 236 and 235—in the first and second solution chambers of the reactors 14A and 16A, respectively—is also of graphite, suitably in the form of woven cloth in a shredded state.

The reactor assembly 10A is identical in all other respects to the reactor 10 of FIG. 1, with all components—including those omitted for the sake of clarity of illustration in FIG. 13—constructed from materials, such as the polyvynil chloride used in backing plates 232, which are inert to chemical attack. The reactor 10A is advantageously utilized with materials which cannot be held in conventionally constructed reactors with metallic electrodes, such as fluoroborate solutions of tin and lead. Such solutions can be recycled using the apparatus of FIG. 13, by reducing the lead content from 3 gms per liter, typically, to about 2 ppm. The lead is plated out onto the graphite fibers of packing 236 and may be reversed back into a flushing solution in a reversed-polarity operation with the electrodes 218 serving as the anodes of the imposed circuit.

The perspective, partly schematic view of FIG. 14 is, like the views of FIGS. 7 and 13, restricted to the active components of a plate reactor 200, with the chamber-defining spacers, tie-bars and solution conduits omitted from the illustration for the sake of clarity. The reactor 200 is composed of a first plate electrode 208, a microporous septum 230, and a second plate electrode 18A. First and second solution chambers are defined between the septum and electrodes 208 and 18A, respectively. Within the second solution chamber a third plate electrode 188 is also provided, pierced by a multitude of small orifices so as to permit ready circulation of the solution in the chamber, spaced from both the electrode 18A and the septum 230. Intermediate between the second and third plate electrodes, and parallel to both, there is a perforated plastic plate 98 which serves to delimit the volume occupied by packing 237 in contact with the third electrode 188.

The reactor 200 may be employed in the same manner as the reactor 100 of FIG. 7, and may, alternatively, be utilized where in a given mode of employment it is desirable to perform an electrochemical processing step in the absence of a microporous septum. This second mode of use may include a forward operating mode with electrode 188 made negative with respect to the electrode 18A by connecting tabs 234 and 334 to the appropriate terminals of a direct current power source; in a reverse mode, the electrode 188 may be made positive with respect to the electrode 208, using tabs 234 and 34 to make contact with the external electrical circuitry.

EXAMPLE 1

A reactor 10 as shown in FIG. 1 was used for removing silver from a solution containing silver cyanide in an amount of 700 ppm. The total amount of solution to be treated was 35 gallons. The size of the reactor 10 was 18"×16" with a total thickness of 8½". The thickness of each catholyte chamber was ½ inch.

The membrane was made from microporous ceramic aluminum oxide available from GTE Products Corp., Wesgo Division, Belmont, Calif., type AL-1009 Ceramic. The cathodes were made from stainless steel, the anodes were made of titanium coated with iridium oxide available from Diamond Shamrock, catalog number TIR-2000 oxide coating. Each catholyte chamber contained about 4½ ounces of stainless steel wool packing. The septum was ⅜ inch thick.

The solution passed through the first chambers at a rate of about 25 gpm and through the second chamber at a rate of about 25 gpm, corresponding to a velocity of 0.8 feet per second through each first and second chamber. Current was provided to the reactor at a rate of 125 amperes. The concentration of silver in the first solution was reduced to 12 ppm in about 45 minutes and less than 1 ppm in about 90 minutes. The silver, metal plated on the cathode was removed from the cathode in about 65 minutes with 125 amperes of current by continuously passing 5 gallons of stripping or collecting solution through the first chamber while a second solution was held in the second chamber. The stripping solution contained 0.57 troy ounces of silver per gallon. The second solution contained 2 ppm of silver.

EXAMPLE 2

A reactor as shown in FIG. 1 was used for removing gold from a gold stripping solution containing 500 ppm in gold and approximately 2 oz/gal. free cyanide. Total amount of solution was 55 gallons. The reactor 10 was the same as given in Example 1.

Solution was modified by adding 4 oz/gal. sodium chloride. The solution passed through the first chambers at a rate of about 10 gpm and through the second chamber at a rate of about 10 gpm. Current was provided to the reactor at the rate of 100 Amperes. The concentration of gold in the first solution was reduced to 0.4 ppm in about 10½ hours.

After multiple runs in the forward direction, the gold metal plated on the cathode was removed from the cathode by current reversal into 10 gallons of potassium cyanide solution which was at a concentration of 8 oz/gal. of potassium cyanide. The gold collected in 3 hours, completely stripping the cathode of the reactor, was 2.3 oz/gal. or a total of 23 oz. of gold metal.

EXAMPLE 3

A reactor 10 as shown in FIG. 1 was used for removing cadmium from a cyanide solution containing 335 ppm as cadmium metal and approximately 1 oz/gal. free cyanide (CN—). Total amount of solution was 35 gallons. The reactor 10 was the same as given in Example 1.

The solution passed through the first chambers at a rate of about 25 gpm and through the second chambers at a rate of about 25 gpm. Current was provided to the reactor at the rate of about 100 Amperes. The concentration of cadmium in the solution was reduced to nondetectible limits in about 90 minutes.

Thus, toxic metal was removed from a solution and the solution may then be safely discharged to waste.

EXAMPLE 4

A reactor 10 as shown in FIG. 1 was used for removing nickel from a nickel sulfamate solution containing 1781 ppm as nickel. Total amount of solution was 50½ liters. The reactor 10 was the same as given in Example 1.

The solution was modified by adding to it 30 gms/liter of ammonium chloride and pH adjusted to 9.5 with ammonium hydroxide.

The solution passed through the first chambers at a rate of about 25 gpm and through the second chamber at the rate of about 25 gpm. Current provided to the reactor was 125 Amperes. The concentration of gold in the first solution was reduced to 1 ppm in about 120 minutes.

EXAMPLE 5

A reactor 200 as shown in FIG. 14 was used for copper removal and concurrent cyanide destruction. The solution used was a copper cyanide solution containing 3800 ppm total cyanide (CN—) and 200 ppm of copper as metal. Said solution is typical of a dragout solution on a copper electroplating line. Total volume of solution was 20 liters.

Solution was modified by adding a total of 45 gms/liter of sodium chloride to provide additional solution conductivity and chemical activity at the anode.

In the forward direction, the anolyte and catholyte were the same solution. The anode current density was controlled at approximately 150 amps/ft$^2$.

The solution passed through the chamber at the rate of 10 gpm. Current provided to the reactor was 100 Amperes.

After four hours under the described condition, the concentration of both copper and cyanide was reduced to below 1 ppm and could be legally and safely discharged to waste.

The copper plated out onto packing 237 in the forward mode is recovered by electrode reversal ac-oss the septum 230, as in previous examples.

Although the present invention has been described in considerable detail with reference to certain preferred versions thereof, other versions are possible. For example, the catholyte and anolyte can flow upwardly through a cell or one can flow upwardly and the other downwardly, rather than both downwardly as shown in FIG. 6. Therefore the spirit and scope of the appended claims are not necessarily be limited to the description of the preferred versions contained herein.

Similarly, the utilization of the novel electrolytic reactor of the invention may be extended beyond the examples described, and differring embodiments of the reactor—with different geometrical definitions of the enclosure, or incorporating a varying number of active cells in parallel, or incorporating auxiliary devices in the form of controllers for the various fluid flow devices, such as pumps and valves, or for the electrical power supply so as to facilitate the use of the reactor for multistep processes—may be employed to carry out the electrochemical process described.

In the same manner, different materials of construction may be applied in the acutal manufacture of reactors, suited to different chemical environments and uses.

What is claimed is:

1. An electrolytic reactor for the treatment of chemical species dissolved in electrically conductive solutions, comprising:
   (a) a sealed container;
   (b) a microporous, electrically insulating septum subdividing said container into first and second solution chambers;
   (c) first electrode means in said first solution chamber;
   (d) second electrode means in said second solution chamber;
   (e) static surface extension means, composed of discrete, particulate bodies, packing at least one of said solution chambers, in electrically conductive contact with the electrode in said chamber;
   (f) first conduit means, including at least one inlet port and one discharge port, for the introduction of a first electrolyte into said first chamber and the withdrawal of electrolyte therefrom;
   (g) second conduit means, including at least one inlet port and one discharge port, for the introduction of a second electrolyte into, and the withdrawal thereof from, said second chamber;
   (h) current supply means for the imposition of a direct electrical potential across said first and second electrode means, and
   (i) current reversing means, for reversing the potential applied across said first and second electrode means.

2. The electrolytic reactor of claim 1, wherein one of said electrodes forms part of said container.

3. The electrolytic reactor of claim 1, wherein:
   said first electrode means form the anode, and said second electrode means form the cathode of the circuit powered by said current supply means;
   said surface extension means comprise a plurality of metallic bodies in conductive contact with one-another and with said second electrode means; and
   a second electrolyte flowing through said second solution chamber contains cyanide ions and ions of at least one precious metal, with said precious metal ions plating out on said electrode and said metallic bodies in said second solution chamber.

4. The electrolytic reactor of claim 3, wherein said metallic bodies are formed of a stainless steel.

5. The electrolytic reactor of claim 4, wherein said second electrolyte is a cyanide leach solution.

6. The electrolytic reactor of claim 1, wherein an aqueous solution containing both a metal cyanide and a chloride salt is passed initially through said first solution chamber and, subsequently, through said second solution chamber, whereby said metal is plated out at electrode means forming the cathode of the circuit powered by said current supply means, and the cyanide is oxidized to nitrogen and carbon dioxide gases at the anode of said circuit.

7. The electrolytic reactor of claim 1, additionally comprising:
   (j) first pumping means for a first electrolyte, impelling said first electrolyte into turbulent flow through said first solution chamber, via said first conduit means.

8. The electrolytic reactor of claim 7, wherein the velocity of said electrolyte flowing through said first solution chamber is at least one foot per second.

9. The electrolytic reactor of claim 1, wherein said container is formed as an upright circular cylinder.

10. The electrolytic reactor of claim 1, wherein said container is formed as a right polygonal body.

11. The electrolytic reactor of claim 10, wherein said second electrode means forms part of said container.

12. The electrolytic reactor of claim 10, wherein said second electrode means include a principal electrode and at least one auxiliary electrode.

13. The electrolytic reactor of claim 12, wherein said first electrode means form part of said container.

14. An electrolytic reactor for the treatment of chemical species dissolved in electrically conductive solutions, comprising:
   (a) a sealed container;
   (b) a microporous, electrically insulating septum subdividing said container into first and second solution chambers;
   (c) first electrode means in said first solution chamber;
   (d) second electrode means in said second solution chamber;

(e) static surface extension means composed of discrete particulate bodies, packing at least one of said solution chambers, in electrically conductive contact with the electrode in said chamber;
(f) conduit means for conveying a first electrolyte into, and out of, said first solution chamber;
(g) channel means for conveying a second electrolyte into, and out of, said second solutions chamber;
(h) current supply means for the imposition of direct electrical potential across said first and second electrode means;
(i) current reversing means, for reversing the potential applied by said current supply means to said electrodes; and
(j) pumping means for conveying an electrolyte through said first solution chamber under conditions of turbulent flow, via said conduit means.

15. The electrolytic reactor of claim 14, additionally comprising
(k) controller means, for governing the operation of said pumping means, said current supply means and said current reversing means in a preselected sequence to accomplish the treatment of said first electrolyte.

16. An electrolytic reactor for the treatment of chemical species dissolved in electrically conductive solutions, comprising:
(a) a sealed container in the form of an upright cylinder;
(b) a microporous, electrically insulating septum subdividng said container into concentric first and second solution chambers, with said second solution chamber adjacent to the cylindrical peripheral wall of said container;
(c) first electrode means in said first solution chamber;
(d) second electrode means in said second solution chamber;
(e) static surface extension means of electrically conductive particulate in at least one of said solution chambers in electrically conductive contact with the electrode means in such chamber;
(f) conduit means for conveying a first electrolyte into, and out of, said first solution chamber;
(g) channel means for conveying a second elctrolyte into, and out of, said second solution chamber;
(h) direct current supply means, for the imposition of a potential difference across said first and second electrode means;
(i) current reversing means, for reversing the potential difference applied by said direct current supply means; and
(j) pump means, for conveying a first electrolyte through said first solution chamber, via said conduit means, under conditions of turbulent flow.

17. An electrolytic reactor for the treatment of chemical species dissolved in electrically conductive solutions, comprising:
(a) a container in the form of a right parallelepiped, created by the mutually sealing assembly of successive rectangular components, including:
a first plate electrode;
a first hollow spacer, defining therewithin a first solution chamber;
a microporous, electrically insulating septum, constructed from an alumina aromic, inset within a a non-permeable frame;
a second hollow spacer, defining therewithin a second solution chamber; and
a second plate electrode;
(b) static surface extension means in at least one of said solution chambers;
(c) first channel means, including at least one inlet port and at least one discharge port, communicating with said firsst solution chamber;
(d) second channel means, including at least one inlet port and one discharge port, communicating with said second solution chamber;
(e) reversible direct current supply means, for the imposition of an electrical potential across said first and second plate electrodes; and
(f) pumping means, for conveying an electrolyte through said first solution chamber, via said first channel means, under conditions of turbulent flow.

18. An electrolytic reactor for the treatment of chemical species dissolved in electrically conductive solutions, comprising:
(a) a container in the form of a right parallelepiped, created by the mutually sealing assembly of successive rectangular components, including:
a first plate electrode;
a first hollow spacer, defining therewithin a first solution chamber;
a microporous, electrically insulating spetum, inset within a non-permeable frame;
a second hollow spacer;
an auxiliary plate electrode pierced by a plurality of orifices in its central portion;
a third hollow spacer, defining, in cooperation with said second hollow spacer, a second solution chamber; and
a second plate electrode;
(b) static, electrically conductive surface extension means in said first solution chamber;
(c) first channel means, including at least one inlet port and one discharge port, communicating with said first solution chamber;
(d) second channel means, including at least one inlet port and one discharge port, communicating with said second solution chamber;
(e) reversible direct current supply means, for the imposition of a forward electrical potential across said first and second plate electrodes and the imposition of a reverse electrical potential across said first plate electrode and said auxiliary plate electrode; and
(f) pumping means, for conveying an electrolyte through said first solution chamber, via said first channel means, under conditions of turbulent flow.

19. An electrolytic reactor for the treatment of chemical species dissolved in electrically conductive solutions, comprising:
(a) a sealed container;
(b) a microporous, electrically insulating septum, constructed from an alumina ceramic, subdividing said container into first and second solution chambers;
(c) first electrode means in said first solution chamber;
(d) second electrode means in said second solution chamber;
(e) static surface extension means in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means; and (i) current reversing means, for reversing the potential across said first and second electrode means, wherein the reactor is so constructed that one of said electrodes forms part of said container.

20. An electrolytic reactor for the treatment of chemical species dissolved in electrically conductive solutions, comprising:
(a) a sealed container;
(b) a microporous, electrically insulating septum, constructed from an alumina ceramic, subdividing said container into first and second solution chambers;
(c) first electrode means in said first solution chamber;
(d) second electrode means in said second solution chamber;
(e) static surface extension means in said second solution chamber, comprised of a plurality of metallic bodies in electrically conductive contact with one-another and with said second electrode;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
(h) current supply means, for the imposition of a direct electrical potential across said first and second electrode means, with said first electrode forming the anode and said second electrode means forming the cathode of the circuit powered by said current supply means; and
(i) current reversing means, for reversing the potential across said first and second electrode means, wherein said second electrolyte flowing through said second solution chamber is an aqueous solution of thiocyanide or thiosulfate which had been passed through a container of ion exchange resin loaded with a precious metal, causing said precious metal to plate out on said metallic bodies and said electrode means in said second solution chamber.

21. An electrolytic reactor for the treatment of chemical species dissolved in electrically conductive solutions, comprising:
(a) a sealed container in the form of an upright circular cylinder;
(b) a microporous, electrically insulating septum subdividing said container into first and second solution chambers;
(c) first electrode means in said first solution chamber;
(d) second electrode means in said second solution chamber, forming part of said container;
(e) static surface extension means in at least one of said solution chambers, in electrically conductive contact with the electrode in said chamber;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
(h) current supply means, for the imposition of a direct electrical potential across said first and second electrode means; and
(i) current reversing means, for reversing the potential across said first and second electrode means.

22. The electrolytic reactor of claim 21, wherein:
said container is partially defined by a top plate of electrically insulating material in sealing engagement with the cylindrical peripheral wall of said container; and
wherein said septum is in the form of a cylinder extending between the base of said container and said top plate, spaced from and concentric with the inner surface of said cylindrical peripheral wall.

23. The electrolytic reactor of claim 22, wherein the inlet and outlet ports of said first and second conduit means are defined in said top plate.

24. The electrolytic reactor of claim 22, wherein said first electrode means comprises a metal rod depending from said electrically insulating top plate into said first solution chamber.

25. An electrolytic reactor for the treatment of chemical species dissolved in electrically conductive solutions, comprising:
(a) a sealed container in the form of an upright circular cylinder;
(b) a microporous, electrically insulating septum subdividing said container into first and second solution chambers;
(c) first electrode means in said first solution chamber;
(d) second electrode means in said second solution chamber;
(e) static surface extension means, comprising a plurality of metallic bodies in electrically conductive contact with one-another and with said second electrode means in said second solution chamber;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
(h) current supply means, for the imposition of a direct electrical potential across said first and second electrode means, said first electrode means forming the anode and second electrode means the cathode of the circuit powered by said current supply means; and
(i) current reversing means, for reversing the potential across said first and second electrode means
wherein said second electrolyte flowing through said second solution chamber contains cyanide ions, and ions of at least one precious metal, with said precious metal ions plating out on said second electrode and said metallic bodies.

26. The electrolytic reactor of claim 25, wherein said second electrolyte is a cyanide leach solution.

27. An electrolytic reactor for the treatment of chemical species dissolved in electrically conductive solutions, comprising:
(a) a sealed container in the form of an upright circular cylinder;
(b) a microporous, electrically insulating septum subdividing said container into first and second solution chambers;
(c) first electrode means in said first solution chamber;
(d) second electrode means in said second solution chamber;
(e) static surface extension means, comprising a plurality of metallic bodies in electrically conductive contact with one-another and with said second electrode means in said second solution chamber;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
current supply means, for the imposition of a direct electrical potential across said first and second electrode means, said first electrode means forming the anode and second electrode means the cathode of the circuit powered by said current supply means; and
(i) current reversing means, for reversing the potential across said first and second electrode means
wherein said second electrolyte
flowing through said second solution chamber is an aqueous solution of thiocyanide or thiosulfate which had been passed through a container of ion-exchange resin loaded with a precious metal, causing said precious metal to plate out on said metallic bodies and on said electrode means in said second solution chamber.

28. An electrolytic reactor for the treatment of chemical species dissolved in electrically conductive solutions, comprising:
(a) a sealed container in the form of an upright circular cylinder;
(b) a micropororus, electrically insulating septum subdividing said container into first and second solution chambers;
(c) first electrode means in said first solution chamber;
(d) second electrode means in said second solution chamber;
(e) static surface extension means in at least one of said solution chambers, in electrically conductive contact with the electrode in said chamber;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
(h) current supply means, for the imposition of a direct electrical potential across said first and second electrode means; and
(i) current reversing means, for reversing the potential across said first and second electrode means
wherein an aqueous solution containing both a metal cyanide and a chloride salt is passed initially through said first solution chamber and, subsequently, through said second solution chamber, whereby said metal is plated out at the electrode means forming the cathode of the circuit powered by said current supply means, and the cyanide is oxidized to nitrogen and carbon dioxide gases at the anode of said circuit.

29. An electrolytic reactor for the treatment of chemical species dissolved in electrically conductive solutions, comprising:
(a) a sealed container in the form of an upright circular cylinder;
(b) a microporous, electrically insulating septum subdividing said container into first and second solution chambers;
(c) first electrode means in said first solution chamber;
(d) second electrode means in said second solution chamber;
(e) static surface extension means in at least one of said solution chambers, in electrically conductive contact with the electrode in said chamber;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
(h) current supply means, for the imposition of a direct electrical potential across said first and second electrode means; and
(i) current reversing means, for reversing the potential across said first and second electrode means;
(j) first pumping means for a first electrolyte, impelling said first electrolyte into turbulent flow through said first solution chamber, via said first conduit means.

30. Apparatus for the electrolytic treatment of chemical species in solution, comprising at least two flat-plate reactors assembled together, each of the flat-plate reactors comprising:
(a) first and second rectangular plate electrodes;
(b) first and second solution chambers defined between said plate electrodes;
(c) a rectangular septum, formed of an electrically insulating microporous material, spaced from both plate electrodes, and intermediate therebetween, separating said first and second solution chambers from one-another;
(d) a first hollow spacer between said first electrode and the septum;
(e) a second hollow spacer between the septum and said second electrode;
(f) first conduit means, including at least one inlet port and one discharge port, for continuously introducing and withdrawing a first electrolyte respectively into, and from, said first solution chamber;

(g) second conduit means, including at least one inlet port and one discharge port, for continuously introducing and withdrawing a second electrolyte respectivly into, and from, said second solution chamber;

(h) pumping means for continuously introducing the first electrolyte into said first solution chamber under conditions of turbulent flow;

(i) a direct-current power supply for reversibly applying an electrical potential across said first and second plate electrodes, wherein said first plate electrode is shared by two adjacent flat-plate reactors; and (j) static, elecrically conductive packing material in conductive contact with at least one of said plate electrodes, filling the solution chamber adjacent to said one of said plate electrodes.

31. The apparatus of claim 30, wherein said second electrode means include a principal plate electrode and at least one auxiliary electrode within said second solution chamber.

32. The apparatus of claim 31, wherein said auxiliary electrode is a plate electrode parallel to, and spaced from, both said principal plate electrode and said septum, and wherein said auxiliary electrode is pierced by a plurality of orificies to permit fluid communication across the volume of said second solution chamber.

33. An electrolytic reactor for the treatment of chemical species dissolved in electrically conductive solutions, comprising:

(a) a sealed container formed as a right polygonal body;

(b) a microporous, electrically insulating septum, subdividing said container into first and second solution chambers;

(c) first electrode means in said first solution chamber;

(d) second electrode means in said second solution chamber forming part of said container;

(e) static surface extension means in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means; and (i) current reversing means, for reversing the potential across said first and second electrode means wherein said inlet and outlet ports of said first and second conduit means are located, respectively, at opposing corners of the polygonal outline of said first and second solution chambers.

34. The electrolytic reactor of claim 33, wherein said polygonal shape is a rectangular parallelepiped.

35. The electrolytic reactor of claim 34, wherein said static surface extension means are formed of metallic bodies, and additionally comprising:

(j) first pumping means for a first electrolyte, impelling said first electrolyte into turbulent flow through said first solution chamber, via said first conduit means.

36. The electrolytic reactor of claim 35, wherein the velocity of said first electrolyte through said first solution chamber is at least one foot per second.

37. An electrolytic reactor for the treatment of chemical species dissolved in electrically conductive solutions, comprising:

(a) a sealed container formed as a right polygonal body;

(b) a microporous, insulating septum subdividing said container into first and second solution chambers;

(c) first electrode means in said first solution chamber;

(d) second electrode means, including a principal electrode and at least one auxiliary electrode, in said second solution chamber;

(e) static surface extension means in at least one of said solution chambers, in electrically conductive contact with the electrode means in that chamber;

(f) first conduit means, including at least one inlet port and one discharge port, for the introduction of a first electrolyte into said first solution chamber and the withdrawal of electrolyte therefrom;

(g) second conduit means, including at least one inlet port and one discharge port, for the introduction of a second electrolyte into said second solution chamber and the withdrawal of electrolyte therefrom;

(h) current supply means, for the imposition of direct electrical potential across said first and second electrode means; and (i) current reversing means for reversing the polarity applied across said first and second electrode means, with said current supply means alternately connected to said principal electrode and said auxiliary electrode of the second electrode means by the operation of the current reversing means wherein the electrolytic reactor is constructed with said inlet and outlet ports of said first and second conduit means located, respectively, at opposing corners of the polygonal outline of said first and second solution chambers.

38. An electrolytic reactor for the treatment of chemical species dissolved in electrically conductive solutions, comprising:

(a) a sealed container formed as a right rectangular paralleliped;

(b) a microporous, insulating septum subdividing said container into first and second solution chambers;

(c) first electrode means in said first solution chamber;

(d) second electrode means, including a principal electrode and at least one auxiliary electrode, in said second solution chamber;

(e) static surface extension means in at least one of said solution chambers, in electrically conductive contact with the electrode means in that chamber;

(f) first conduit means, including at least one inlet port and one discharge port, for the introduction of a first electrolyte into said first solution chamber and the withdrawal of electrolyte therefrom;

(g) second conduit means, including at least one inlet port and one discharge port, for the introduction of a second electrolyte into said second solution chamber and the withdrawal of electrolyte therefrom;

(h) current supply means, for the imposition of direct electrical potential across said first and second electrode means; and (i) current reversing means for reversing the polarity applied across said first and second electrode means, with said current supply means alternately connected to said principal electrode and said auxiliary electrode of the second electrode means by the operation of the current reversing means wherein the electrolytic reactor is constructed with said one auxiliary electrode as a foraminous plate electrode parallel to, and spaced from, said principal electrode.

39. The electrolytic reactor of claim 38, wherein said static surface extension means are formed of metallic bodies, and additionally comprising:

(j) first pumping means for a first electrolyte, impelling said first electrolyte into turbulent flow through said first solution chamber, via said first conduit means.

40. The electrolytic reactor of claim 39, wherein the velocity of said first electrolyte through the first solution chamber is at least one foot per second.

41. A method for operating an electrolytic reactor incorporating:

(a) a sealed container;
(b) a microporous, electrically insulating septum subdividing said container into first and second solution chambers;
(c) first electrode means in said first solution chamber;
(d) second electrode means in said second solution chamber;
(e) static surface extension means in at least one of said solution chambers, in electrically conductive contact with the electrode in said chamber;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
(h) current supply means, for the imposition of a direct electrical potential across said first and second electrode means; and
(i) current reversing means, for reversing the potential across said first and second electrode means;

said method comprising the steps of:

(i) continuously passing a first electrolyte containing a metallic ion species through the first solution chamber under conditions of turbulent flow;
(ii) filling the second solution chamber with a static volume of a second electrolyte; and
(iii) energizing the current supply means so that the first electrode means is negative with respect to the second electrode means, causing said metallic ion species to plate out on the first electrode means.

42. The method of claim 41, comprising the additional steps of:

(iv) operating the current reversing means to reverse the polarity applied across the first and second electrode means; and
(v) continuously passing a recovery solution through the first solution chamber, to collect the metal previously plated onto the first electrode means.

43. A method for operating an electrolytic reactor incorporating:

(a) a sealed container;
(b) a microporous, electrically insulating septum, constructed from an alumina ceramic, subdividing said container into first and second solution chambers;
(c) first electrode means in said first solution chamber;
(d) second electrode means in said second solution chamber;
(e) static surface extension means in at least one of said solution chambers, in electrically conductive contact with the electrode in said chamber;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
(h) current supply means, for the imposition of a direct electrical potential across said first and second electrode means; and
(i) current reversing means, for reversing the potential across said first and second electrode means, wherein the reactor is so constructed that one of said electrodes forms part of said container;

said method comprising the steps of:

(i) continuously passing a first electrolyte containing a metallic ion species through the first solution chamber under conditions of turbulent flow;
(ii) filling the second solution chamber with a static volume of a second electrolyte; and
(iii) energizing the current supply means so that the first electrode means is negative with respect to the second electrode means, causing said metallic ion species to plate out on the first electrode means.

44. The method of claim 43, comprising the additional steps of:

(iv) operating the current reversing means to reverse the polarity applied across the first and second electrode means; and
(v) continuously passing a recovery solution through the first solution chamber, to collect the metal previously plated onto the first electrode means.

45. A method for operating an electrolytic reactor incorporating:

(a) a sealed container formed as a right polygonal body;
(b) a microporous, electrically insulating septum subdividing said container into first and second solution chambers;
(c) first electrode means in said first solution chamber;
(d) second electrode means in said second solution chamber;
(e) static surface extension means in at least one of said solution chambers, in electrically conductive contact with the electrode in said chamber;
(f) first conduit means, including at least one inlet port and one discharge port, for the introduction of a first electrolyte into said first chamber and the withdrawal of electrolyte therefrom;
(g) second conduit means, including at least one inlet port and one discharge port, for the introduction of a second electrolyte into, and the withdrawal thereof from, said second chamber;
(h) current supply means, for the imposition of a direct electrical potential across said first and second electrode means; and (i) current reversing means, for reversing the potential across said first and second electrode means; said method comprising the steps of:

(i) continuously passing a first electrolyte containing a metallic ion species through the first solution chamber under conditions of turbulent flow;

(ii) filling the second solution chamber with a static volume of a second electrolyte; and (iii) energizing the current supply means so that the first electrode means is negative with respect to the second electrode means, causing said metallic ion species to plate out on the first electrode means.

46. The method of claim 45, comprising the additional steps of:

(iv) operating the current reversing means to reverse the polarity applied across the first and second electrode means; and (v) continuously passing a recovery solution through the first solution chamber, to collect the metal previously plated onto the first electrode means.

47. A method for operating an electrolytic reactor incorporating:

(a) a sealed container formed as a rectangular parallelepiped;

(b) a microporous, electrically insulating septum subdividing said container into first and second solution chambers;

(c) first electrode means in said first solution chamber;

(d) second electrode means in said second solution chamber, forming part of said container;

(e) static surface extension means, formed of metallic bodies, in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means;

(i) current reversing means, for reversing the potential across said first and second electrode means; and (j) first pumping means for the first electrolyte;

said method comprising the steps of:

(i) continuously passing a first electrolyte containing a metallic ion species through the first solution chamber under conditions of turbulent flow, at a velocity greater than one foot per second;

(ii) filling the second solution chamber with a static volume of a second electrolyte; and (iii) energizing the current supply means so that the first electrode means is negative with respect to the second electrode means, causing said metallic ion species to plate out on the first electrode means.

48. The method of claim 47, comprising the additional steps of:

(iv) operating the current reversing means to reverse the polarity applied across the first and second electrode means; and (v) continuously passing a recovery solution through the first solution chamber, to collect the metal previously plated onto the first electrode means.

49. A method for operating an electrolytic reactor incorporating:

(a) a sealed container formed as a right polygonal body;

(b) a microporous, electrically insulating septum subdividing said container into first and second solution chambers;

(c) first electrode means in said first solution chamber;

(d) second electrode means, including a principal electrode and at least one auxiliary electrode, in said second solution chamber;

(e) static surface extension means in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means; and (i) current reversing means, for reversing the potential across said first and second electrode means; said method comprising the steps of:

(i) continuously passing a first electrolyte containing a metallic ion species through the first solution chamber under conditions of turbulent flow;

(ii) filling the second solution chamber with a static volume of a second electrolyte; and (iii) energizing the current supply means so that the principal electrode of the second electrode means is made positive with respect to the first electrode means, causing said metallic ion species to plate out on the first electrode means.

50. The method of claim 49, comprising the additional steps of:

(iv) operating the current reversing means to make the auxiliary electrode of said second electrode means negative with respect to the first electrode means; and (v) continuously passing a recovery solution through the first solution chamber, to collect the metal previously plated onto the first electrode means.

51. A method for operating electrolytic apparatus incorporating at least two flat-plate reactors assembled together, each such flat-plate reactor comprising:

(a) first and second rectangular plate electrodes, with the first plate electrode shared in common by two adjacent flat-plate reactors;

(b) first and second solution chambers defined between said plate electrodes;

(c) a rectangular septum, formed of an electrically insulating microporous material, spaced from both plate electrodes and intermediate therebetween, separating said first and second solution chambers from one-another;

(d) a first hollow spacer between the first plate electrode and the septum;

(e) a second hollow spacer between said septum and said second plate electrode;

(f) first conduit means, including at least one inlet port and one discharge port, for continuously introducing and withdrawing a first electrolyte respectively into, and from, said first solution chamber;

(g) second conduit means, including at least one inlet port and one discharge port, for continuously introducing and withdrawing a second electrolyte respectively into, and from, said second solution chamber;

(h) pumping means for continuously introducing the first electrolyte into said first solution chamber under conditions of turbulent flow;

(i) a direct-current power supply for reversibly applying an electrical potential across said first and second plate electrodes; and (j) static, electrically conductive, material in conductive contact one of said plate electrodes, filling the solution chamber adjacent to said one of said plate electrodes;

said method comprising the steps of:

(i) continuously passing a first electrolyte, containing a metallic ion species, through the first solution chamber under conditions of turbulent flow;

(ii) filling the second solution chamber with a static volume of a second electrolyte; and (iii) energizing the current supply means so that the principal electrode of the second electrode means is made positive with respect to the first electrode means, causing said metallic ion species to plate out on the first electrode means.

52. The method of claim 51, comprising the additional steps of:

(iv) operating the current reversing means to make the auxiliary electrode of said second electrode means negative with respect to the first electrode means; and (v) continuously passing a recovery solution through the first solution chamber, to collect the metal previously plated onto the first electrode means.

53. The method of claim 50 or of claim 52, wherein both said first and second electrolytes contain metal ions and cyanide ions.

54. A method for operating an electrolytic reactor, for the pourpose of removing metal ions from electrolytes also containing cyanide ions, with said reactor incorporating:

(a) a sealed container formed as a right polygonal body;

(b) a microporous, electrically insulating septum subdividing said container into first and second solution chambers;

(c) first electrode means in said first solution chamber;

(d) second electrode means in said second solution chamber;

(e) static surface extension means in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means; and (i) current reversing means, for reversing the potential across said first and second electrode means; said method comprising the steps of:

(i) continuously passing a first electrolyte, containing a metallic ion species, through the first solution chamber under conditions of turbulent flow;

(ii) filling the second solution chamber with a static volume of a second electrolyte; and (iii) energizing the current supply means so that the first electrode means are made negative with respect to the second electrode means, causing said metallic ion species to plate out on the first electrode means;

(iv) operating said current reversing means, to reverse the polarity applied to the first and second electrode means; and (v) continuously passing a recovery solution through the first solution chamber, to collect the metal previously plated onto the first electrode means in step (iii).

55. A method for operating an electrolytic reactor, for the purpose of removing metallic ions from electrolytes also containing cyanide ions, with said reactor incorporating:

(a) a sealed container formed as a rectangular parallelepiped;

(b) a microporous, electrically insulating septum subdividing said container into first and second solution chambers;

(c) first electrode means in said first solution chamber;

(d) second electrode means in said second solution chamber, forming part of said container;

(e) static surface extension means, formed of metallic bodies, in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means;

(i) current reversing means, for reversing the potential across said first and second electrode means; and (j) first pumping means for the first electrolyte;

said method comprising the steps of:

(i) continuously passing a first electrolyte, containing a metallic ion species, through the first solution chamber under conditions of turbulent flow;

(ii) filling the second solution chamber with a static volume of a second electrolyte; and (iii) energizing the current supply means so that the first electrode means are made negative with respect to the second electrode means, causing said metallic ion species to plate out on the first electrode means;

(iv) operating said current reversing means, to reverse the polarity applied to the first and second electrode means; and (v) continuously passing a recovery solution through the first solution chamber, to collect the metal perviously plated onto the first electrode means in step (iii).

56. The method of claim 54 or of claim 55, wherein the first and second electrolytes have the same initial composition.

57. A method for operating an electrolytic reactor for the purpose of recovering metallic ions selected from the group of copper, silver or gold, from electrolytes also containing cyanide ions, with said reactor incorporating:

(a) a sealed container;

(b) a microporous, electrically insulating septum subdividing said container into first and second solution chambers;

(c) first electrode means in said first solution chamber;

(d) second electrode means in said second solution chamber;

(e) static surface extension means in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means; and (i) current reversing means, for reversing the potential across said first and second electrode means;

said method comprising the steps of:

(i) continuously passing a first electrolyte containing a metallic ion species through the first solution chamber under conditions of turbulent flow;

(ii) filling the second solution chamber with a static volume of a second electrolyte;

(iii) energizing the current supply means so that the first electrode means is negative with respect to the second electrode means, causing said metallic ion species to plate out on the first electrode means;

(iv) operating the current reversing means, to reverse the polarity applied to the first and second electrode means; and (v) continuously passing a recovery solution through the first solution chamber, to collect the metal previously plated onto the first electrode means.

58. A method for operating an electrolytic reactor for the purpose of recovering metallic ions selected from the group of copper, silver or gold, from electrolytes also containing cyanide ions, with said reactor incorporating:

(a) a sealed container;

(b) a microporous, electrically insulating septum, constructed from an alumina ceramic, subdividing said container into first and second solution chambers;

(c) first electrode means in said first solution chamber;

(d) second electrode means in said second solution chamber;

(e) static surface extension means in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means; and (i) current reversing means, for reversing the potential across said first and second electrode means;

said method comprising the steps of:

(i) continuously passing a first electrolyte, containing a metallic ion species, through the first solution chamber under conditions of turbulent flow;

(ii) filling the second solution chamber with a static volume of a second electrolyte;

(iii) energizing the current supply means so that the first electrode means is negative with respect to the second electrode means, causing said metallic ion species to plate out on the first electrode means;

(iv) operating the current reversing means, to reverse the polarity applied to the first and second electrode means; and (v) continuosly passing a recovery solution through the first solution chamber, to collect the metal previously plated onto the first electrode means.

59. The method of claim 57 or of claim 58, wherein said electrolyte also contains sodium chloride ions.

60. A method for operating an electrolytic reactor for the purpose of recovering metallic ions—selected from the group of nickel, cadmium and lead—from electrolytes also containing cyanides or sulfamates, with said reactor incorporating:

(a) a sealed container;

(b) a microporous, electrically insulating septum subdividing said container into first and second solution chambers;

(c) first electrode means in said first solution chamber;

(d) second electrode means in said second solution chamber;

(e) static surface extension means in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means; and (i) current reversing means, for reversing the potential across said first and second electrode means;

said method comprising the steps of:

(i) continuously passing a first electrolyte containing a metallic ion species through the first solution chamber under conditions of turbulent flow;

(ii) filling the second solution chamber with a static volume of a second electrolyte;

(iii) energizing the current supply means so that the first electrode means is negative with respect to the second electrode means, causing said metallic ion species to plate out on the first electrode means;

(iv) operating the current reversing means, to reverse the polarity applied to the first and second electrode means; and (v) continuosly passing a recovery solution through the first solution chamber, to collect the metal previously plated onto the first electrode means.

61. A method for operating an electrolytic reactor for the purpose of recovering metallic ions—elected from the group of nickel, cadmium and lead—from electrolytes also containing cyanides or sulfamates, with said reactor incorporating:

(a) a sealed container;

(b) a microporous, electrically insulating septum, constructed from an alumina ceramic, subdividing said container into first and second solution chambers;

(c) first electrode means in said first solution chamber;

(d) second electrode means in said second solution chamber;

(e) static surface extension means in at least one of said solution chambers, in electrically conductive contact with the electrode in said chamber;

(f) first conduit means, including at least one inlet port and one discharge port, for the introduction of a first electrolyte into said first chamber and the withdrawal of electrolyte therefrom;

(g) second conduit means, including at least one inlet port and one discharge port, for the introduction of a second electrolyte into, and the withdrawal thereof from, said second chamber;

(h) current supply means, for the imposition of a direct electrical potential across said first and second electrode means; and (i) current reversing means, for reversing the potential across said first and second electrode means;

said method comprising the steps of:

(i) continuously passing a first electrolyte containing a metallic ion species through the first solution chamber under conditions of turbulent flow;

(ii) filling the second solution chamber with a static volume of a second electrolyte;

(iii) energizing the current supply means so that the first electrode means is negative with respect to the second electrode means, causing said metallic ion species to plate out on the first electrode means;

(iv) operating the current reversing means, to reverse the polarity applied to the first and second electrode means; and (v) continuosly passing a recovery solution through the first solution chamber, to collect the metal previously plated onto the first electrode means.

* * * * *